(12) United States Patent
Minoshima et al.

(10) Patent No.: US 7,863,217 B2
(45) Date of Patent: Jan. 4, 2011

(54) EXHAUST GAS PURIFYING CATALYST AND EXHAUST GAS PURIFYING METHOD

(75) Inventors: Koji Minoshima, Hiroshima (JP); Hiroshi Yamada, Hiroshima (JP); Seiji Miyoshi, Hiroshima (JP); Hideharu Iwakuni, Hiroshima (JP); Akihide Takami, Hiroshima (JP)

(73) Assignee: Mazda Motor Corporation (JP)

( * ) Notice: Subject to any disclaimer, the term of this patent is extended or adjusted under 35 U.S.C. 154(b) by 123 days.

(21) Appl. No.: 11/790,942

(22) Filed: Apr. 30, 2007

(65) Prior Publication Data

US 2007/0274890 A1  Nov. 29, 2007

(30) Foreign Application Priority Data

May 23, 2006  (JP) ............................. 2006-142767

(51) Int. Cl.
*B01J 23/10* (2006.01)
*B01J 21/06* (2006.01)

(52) U.S. Cl. ........................ 502/304; 502/302; 502/325; 502/349

(58) Field of Classification Search .................. 502/302, 502/304, 325, 326, 349
See application file for complete search history.

(56) References Cited

U.S. PATENT DOCUMENTS

| 5,814,576 | A | 9/1998 | Yamamoto |
| 6,692,712 | B1 * | 2/2004 | Andersen .................. 423/239.1 |
| 6,956,008 | B2 * | 10/2005 | Takeshima et al. .......... 502/326 |
| 2004/0235651 | A1 | 11/2004 | Uenishi et al. |
| 2005/0070428 | A1 | 3/2005 | Kawamoto et al. |
| 2005/0255993 | A1 | 11/2005 | Tanaka et al. |
| 2006/0019824 | A1 | 1/2006 | Miyoshi et al. |
| 2006/0233678 | A1 | 10/2006 | Miyoshi et al. |

(Continued)

FOREIGN PATENT DOCUMENTS

EP  0637461  *  2/1995

(Continued)

OTHER PUBLICATIONS

European Search Report Application 07108520 dated Aug. 29, 2007.

(Continued)

*Primary Examiner*—Timothy C Vanoy
*Assistant Examiner*—Diana J Liao
(74) *Attorney, Agent, or Firm*—Studebaker & Brackett PC; Donald R. Studebaker

(57) ABSTRACT

Disclosed is an exhaust gas purifying catalyst, which comprises a catalyst layer formed on a honeycomb-shaped support. The catalyst layer is formed by mixing a catalyst powder (A) consisting of a composite oxide (RhZrCeNdO) which contains at least Ce, Zr, and a catalytic noble metal composition, and a catalyst powder (B) consisting of a Zr-based oxide (RhZrXO) which contains at least Zr and has Rh existing on a surface thereof. A ratio (RhZrXO/RhZrCeNdO) of a mass of the catalyst powder (B) to a total mass of the catalyst powder (A) and the catalyst powder (B) may be set in the range of 1 to 50%. Further, the catalyst powder (B) may consist of a composite oxide which contains Zr as a primary component, a rare-earth metal except Ce, and Rh. The exhaust gas purifying catalyst of the present invention can provide enhanced exhaust gas conversion efficiency.

4 Claims, 11 Drawing Sheets

U.S. PATENT DOCUMENTS

2007/0093381 A1   4/2007   Miyoshi et al.

FOREIGN PATENT DOCUMENTS

| EP | 1 053 779 | 11/2000 |
| EP | 1 174 174 | 1/2002 |
| EP | 1 520 616 | 4/2005 |
| EP | 1520616 | 4/2005 |
| EP | 1 598 104 | 11/2005 |
| EP | 1598104 | 11/2005 |
| EP | 1 704 910 | 9/2006 |
| EP | 1857170 A1 | 11/2007 |
| JP | 2002-282697 | 10/2002 |
| JP | 2004-174490 | 6/2004 |
| JP | 2006-297259 | 11/2006 |

OTHER PUBLICATIONS

European Search Report Application No. EP 07 10 8520 dated Oct. 26, 2007.

Daniel Gosselin, European Office Action, EP 07108520.3, Sep. 3, 2008.

* cited by examiner

EXHAUST GAS PURIFYING CATALYST AND EXHAUST GAS PURIFYING METHOD

BACKGROUND OF THE INVENTION

1. Field of the Invention

The present invention relates to an exhaust gas purifying catalyst and an exhaust gas purifying method.

2. Description of the Related Art

With a view to purifying exhaust gas containing air pollutants, such as HC (hydrocarbon), CO (carbon monoxide) and NOx (nitrogen oxides), an exhaust gas purifying catalyst is provided, for example, in an engine exhaust system of a vehicle, such as an automobile. By use of such an exhaust gas purifying catalyst, HC/CO and NOx can be converted into inert emissions through an oxidation reaction and a reduction reaction, respectively.

As a component for use in the exhaust gas purifying catalyst, there has been known an oxygen-storage material which has a property (so called "oxygen storage/releasing capability") capable of absorbing and storing oxygen in exhaust gas when an exhaust atmosphere is in an oxygen-excess state, i.e., an exhaust air/fuel (A/F) ratio is on a lean side relative to a theoretical (stoichiometric) exhaust A/F ratio, and releasing the oxygen stored therein when the exhaust atmosphere is in an oxygen-deficient state i.e., the exhaust A/F ratio is on a rich side relative to the theoretical exhaust A/F ratio.

For example, a composite oxide containing $CeO_2$ or $CeO_2$—$ZrO_2$ is known as the oxygen-storage material. As one specific example, the Japanese Patent Laid-Open Publication No. 2004-174490 discloses a technique intended to obtain a composite oxide containing Ce, Zr, and Rh as a catalytic metal in an evenly dispersed state, so as to provide a catalyst material having enhanced catalytic conversion efficiency.

As another specific example, the Japanese Patent Laid-Open Publication No. 2002-282697 discloses an exhaust gas purifying catalyst intended to reduce an amount of HC to be discharged during a period before a catalytic metal carried on a catalyst layer is activated, without increasing a thickness of a HC absorbent layer, wherein the exhaust gas purifying catalyst has a three-way catalyst layer which comprises $CeO_2$—$ZrO_2$ and $Rh/ZrO_2$ consisting of a carrier containing $ZrO_2$ and Rh carried on the carrier.

In the conventional composite oxide containing Ce, Zr, and Rh as a catalytic metal, most of the Rh used as a catalytic metal exists within oxide particles, and only a part of the Rh is exposed from a surface of the composite oxide. Thus, as contrasted with an advantage of being able to actively absorb and release oxygen, the composite oxide has a problem about insufficiency of conversion efficiency for exhaust gas emissions absorbed on particles of the composite oxide, particularly in NOx (nitrogen oxides) conversion efficiency, due to limited opportunity of contact between the exhaust gas emissions and the Rh as a catalytic metal.

Currently, there is a strong need for providing an exhaust gas purifying catalyst having further enhanced conversion efficiency for not only NOx but also other exhaust gas emissions including HC and CO. Particular, in view of an engine cold-start condition causing difficulty in ensuring sufficient catalytic conversion efficiency due to a low catalyst temperature, a catalyst temperature is low, and it is required to improve low-temperature catalytic activity in the exhaust gas purifying catalyst.

SUMMARY OF THE INVENTION

In view of the above technical problems, it is an object of the present invention to provide an exhaust gas purifying catalyst and an exhaust gas purifying method, capable of achieving enhanced exhaust gas conversion efficiency using an oxygen-storage material which comprises Rh as a catalytic metal, arranged on a surface of a composite oxide containing Ce and Zr.

In order to achieve the above object, in a first aspect of the present invention, there is provided an exhaust gas purifying catalyst comprising a catalyst layer formed on a honeycomb-shaped support. The catalyst layer is formed by mixing a first catalyst powder (A) consisting of a composite oxide which contains at least Ce, Zr, and a catalytic noble metal composition, and a second catalyst powder (B) consisting of a Zr-based oxide which contains at least Zr and has Rh existing on a surface thereof.

In a second aspect of the present invention, in the exhaust gas purifying catalyst according to the first aspect of the present invention, the second catalyst powder (B) consists of a composite oxide containing Zr and Rh.

In a third aspect of the present invention, in the exhaust gas purifying catalyst according to the first aspect of the present invention, the second catalyst powder (B) consists of a composite oxide which contains Zr as a primary component, a rare-earth metal except Ce, and Rh.

In a fourth aspect of the present invention, in the exhaust gas purifying catalyst according to the first aspect of the present invention, the Rh of the second catalyst powder (B) is carried on the Zr-based oxide containing at least Zr.

In a fifth aspect of the present invention, in the exhaust gas purifying catalyst according to the fourth aspect of the present invention, the Zr-based oxide further contains a rare-earth metal.

In a sixth aspect of the present invention, in the exhaust gas purifying catalyst according to any one of the first to the fifth aspects of the present invention, a ratio of a mass of the second catalyst powder (B) to a total mass of the first catalyst powder (A) and the second catalyst powder (B) is in the range of 1 to 50%.

In a seventh aspect of the present invention, in the exhaust gas purifying catalyst according to the sixth aspect of the present invention, the ratio of the mass of the second catalyst powder (B) to the total mass of the first catalyst powder (A) and the second catalyst powder (B) is in the range of 10 to 40%.

In a eighth aspect of the present invention, in the exhaust gas purifying catalyst according to the third aspect of the present invention, the composite oxide of the second catalyst powder (B) contains the Zr and the rare-earth metal in such a manner that a mass of an oxide of the rare-earth metal to a total mass of $ZrO_2$ and the oxide of the rare-earth metal is in the range of 4 to 32% on the basis of oxide conversion.

In a ninth aspect of the present invention, there is further provided an exhaust gas purifying method for purifying exhaust gas which includes HC emissions, CO emissions, NOx emissions and water vapor, by use of an exhaust gas purifying catalyst formed by mixing a first catalyst powder (A) consisting of a composite oxide which contains at least Ce, Zr, and a catalytic noble metal composition, and a second catalyst powder (B) consisting of a Zr-based oxide which contains at least Zr and has Rh existing on a surface thereof.

The method comprises: allowing the HC emissions and the water vapor to contact the Zr-based oxide having Rh existing on a surface thereof, so as to create CO and $H_2$; inducing a reaction between the created $H_2$ and the NOx emissions after being attached on the composite oxide of the first catalyst powder (A), so as to reduce the NOx emissions; and increasing a temperature of the exhaust gas purifying catalyst formed by mixing the first catalyst powder (A) and the second catalyst powder (B), based on heat generated by the NOx reduction reaction, so as to convert the CO emissions in the exhaust gas and the created CO, into inert emissions through an oxidation reaction.

In the exhaust gas purifying catalyst according to the first aspect of the present invention, the catalyst layer formed on a honeycomb-shaped support is formed by mixing a first catalyst powder (A) consisting of a composite oxide which contains at least Ce, Zr, and a catalytic noble metal composition, and a second catalyst powder (B) consisting of a Zr-based oxide which contains at least Zr and has Rh existing on a surface thereof. This makes it possible to improve low-temperature catalytic activity. Specifically, under a rich (oxygen-deficient) exhaust atmosphere, $H_2$ is created on the Zr-based oxide of the second catalyst powder (B) through a steam-reforming reaction. Although NOx is attached on the composite oxide of the first catalyst powder (A), which contains at least Ce, Zr, and a catalytic metal composition, a part of the NOx is left on the composite oxide in an attached state, because this composite oxide contributes to enhancement in oxygen storage/releasing capability, but has poor NOx reduction function due to a low amount of the catalytic metal composition exposed on a surface thereof, as mentioned above. This meets a condition for readily inducing a reaction between the above created $H_2$ and the attached NOx, and therefore a NOx reduction reaction is facilitated by the created $H_2$ to convert the NOx into inert emissions. Then, the NOx reduction reaction can generate heat to increase a temperature of the catalyst layer so as to achieve enhanced low-temperature conversion efficiency for HC and CO under assistance of oxygen released from the first catalyst powder (A). Thus, the steam-reforming reaction in the second catalyst powder (B) can be utilized positively and effectively for the catalyst powder (A) which consists of a composite oxide containing at least Ce, Zr and a catalytic metal composition.

In the exhaust gas purifying catalyst according to the second aspect of the present invention, the second catalyst powder (B) consists of a composite oxide containing Zr and Rh. This allows the second catalyst powder (B) to effectively achieve the above advantages. In addition, the Rh as a catalytic metal incorporated in the composite oxide as a part thereof can provide enhanced sintering resistance and thermal resistance.

In the exhaust gas purifying catalyst according to the third aspect of the present invention, the second catalyst powder (B) consists of a composite oxide which contains Zr as a primary component, a rare-earth metal except Ce, and Rh. This allows the second catalyst powder (B) to effectively achieve the above advantages. In addition, the Rh as a catalytic metal incorporated in the composite oxide as a part thereof can provide enhanced sintering resistance and thermal resistance.

In the exhaust gas purifying catalyst according to the fourth aspect of the present invention, the Rh of the second catalyst powder (B) is carried on the Zr-based oxide containing at least Zr. This allows the second catalyst powder (B) to effectively achieve the above advantages.

The exhaust gas purifying catalyst according to the fifth aspect of the present invention can fundamentally achieve the advantages as those in the exhaust gas purifying catalyst according to the fourth aspect of the present invention. In particular, the Zr-based oxide additionally containing a rare-earth metal can more effectively achieve the advantages.

In the exhaust gas purifying catalyst according to the sixth aspect of the present invention, the ratio of the mass of the second catalyst powder (B) to the total mass of the first catalyst powder (A) and the second catalyst powder (B) can be in the range of 1 to 50% to effectively achieve the above advantages.

In the exhaust gas purifying catalyst according to the seventh aspect of the present invention, the ratio of the mass of the second catalyst powder (B) to the total mass of the first catalyst powder (A) and the second catalyst powder (B) can be in the range of 10 to 40% to further effectively achieve the above advantages.

In the exhaust gas purifying catalyst according to the eighth aspect of the present invention, the composite oxide of the second catalyst powder (B) contains the Zr and the rare-earth metal in such a manner that a mass of an oxide of the rare-earth metal to a total mass of $ZrO_2$ and the oxide of the rare-earth metal is in the range of 4 to 32% on the basis of oxide conversion. This allows the second catalyst powder (B) to effectively achieve the above advantages.

In the exhaust gas purifying method according to the ninth aspect of the present invention, when the exhaust gas purifying catalyst formed by mixing a first catalyst powder (A) consisting of a composite oxide which contains at least Ce, Zr, and a catalytic noble metal composition, and a second catalyst powder (B) consisting of a Zr-based oxide which contains at least Zr and has Rh existing on a surface thereof, is used for purifying exhaust gas, $H_2$ created on the Zr-based oxide of the second catalyst powder (B) is reacted with NOx attached on the composite oxide of the first catalyst powder (A), and a temperature of the catalyst can be increased based on heat generated by the reaction between the $H_2$ and the NOx, to improve low-temperature catalytic activity. Specifically, under a rich (oxygen-deficient) exhaust atmosphere, $H_2$ is created on the Zr-based oxide of the second catalyst powder (B) through a steam-reforming reaction. Although NOx is attached on the composite oxide of the first catalyst powder (A), which contains at least Ce, Zr, and a catalytic metal composition, a part of the NOx is left on the composite oxide in an attached state, because this composite oxide contributes to enhancement in oxygen storage/releasing capability, but has poor NOx reduction function due to a low amount of the catalytic metal composition exposed on a surface thereof, as mentioned above. This meets a condition for readily inducing a reaction between the above created $H_2$ and the attached NOx, and therefore a NOx reduction reaction is facilitated by the created $H_2$ to convert the NOx into inert emissions. Then, the NOx reduction reaction can generate heat to increase a temperature of the catalyst layer so as to achieve enhanced low-temperature conversion efficiency for HC and CO under assistance of oxygen released from the first catalyst powder (A). Thus, the steam-reforming reaction in the second catalyst powder (B) can be utilized positively and effectively for the catalyst powder (A) which consists of a composite oxide containing at least Ce, Zr and a catalytic metal composition.

DESCRIPTION OF THE PREFERRED EMBODIMENTS

With reference to the drawings, an embodiment of the present invention will now be described. In this embodiment, a combination of a first catalyst powder (A) consisting of a composite oxide which contains at least Ce, Zr, and Rh as a catalytic noble metal, and a second catalyst powder (B) consisting of a Zr-based oxide which contains at least Zr and has Rh existing on a surface thereof, is used as an exhaust gas purifying catalyst.

(1) Preparation of Catalyst Powders

Figure 1:
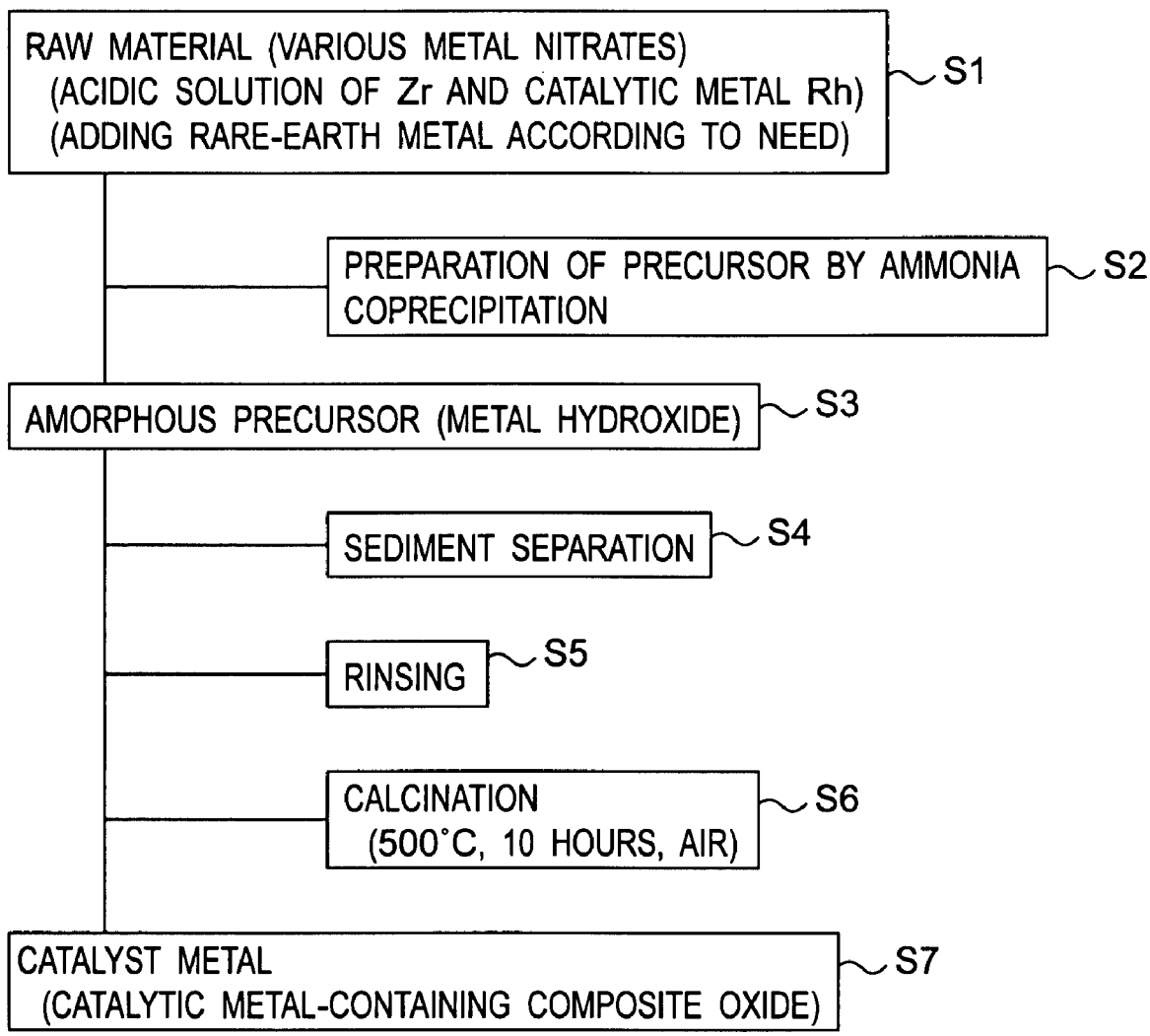
FIG. 1 is an explanatory diagram showing a process of preparing catalyst powders for an exhaust gas purifying catalyst according to one embodiment of the present invention.

A process of preparing the catalyst powder (A) and the catalyst powder (B) in the exhaust gas purifying catalyst according to this embodiment will be firstly described. FIG. 1 is an explanatory diagram showing the process of preparing the catalyst powders for the exhaust gas purifying catalyst according to this embodiment. As shown in FIG. 1, a plurality of solutions of various metal nitrates were mixed together to prepare a raw material (Step S1). Specifically, the raw material was prepared by adding an acidic solution containing a rare-earth metal except Rh and Zr, to an acidic solution containing Rh as a catalytic metal and Zr, according to need.

As to the catalyst powder (A), an acidic solution containing Ce and Nd was added to the acidic solution containing Rh as a catalytic metal and Zr to prepare a raw material. As to the catalyst powder (B), an acidic solution containing a composition selected from rare-earth metals except Ce, such as Pr, Nd, La, Sm, Y or Yb, was added to the acidic solution containing Rh as a catalytic metal and Zr to prepare a raw material. Further, as to the catalyst powder (B), a raw material consisting only of the acidic solution containing Rh as a catalytic metal and Zr was also used.

Aqueous ammonia was added to the acidic solution as the raw material while stirring the acidic solution to prepare a composite-oxide precursor by a coprecipitation method using aqueous ammonia (Step S2). Through the composite-oxide-precursor preparation step S2, the metals contained in the raw material were coprecipitated as a metal hydroxide to obtain an amorphous composite-oxide precursor (Step S3). In this process, aqueous ammonia was used for the coprecipitation method. Alternatively, any other basic solution, such as a sodium hydroxide solution or an oxalate solution, may be used.

The solution containing the composite-oxide precursor and becoming clouded due to the addition of the aqueous ammonia was left for 24 hours. Then, in a sediment separation step S4, a resulting sediment was centrifugalized. Subsequently, in a rinsing step S5, a cake obtained by removing supernatent was sufficiently rinsed with water. Then, in a calcination step S6, the rinsed cake was heated and calcined in air. This calcination was performed at a temperature of 500° C. for a holding time of 10 hours. In this manner, catalyst powders, i.e., composite oxides containing a catalytic metal, for the exhaust gas purifying catalyst according to this embodiment, were obtained (Step S7).

In this embodiment, a catalyst powder (A) consisting of a composite oxide containing Rh as a catalytic metal, Zr, Ce and Nd (this composite oxide will hereinafter be referred to as "RhZrCeNdO"), and a catalyst powder (B) consisting of a composite oxide containing Rh as a catalytic metal, Zr, and a composition selected from rare-earth metals X except Ce, such as Pr, Nd, La, Sm, Y or Yb (this composite oxide will hereinafter be referred to as "RhZrXO"), are obtained. Further, a catalyst powder (B) consisting of a composite oxide containing Rh as a catalytic metal, and Zr (this composite oxide will hereinafter be referred to as "RhZrO") was also obtained.

In each of the catalyst powders (A) and (B), the catalytic metal of Rh is coordinated or arranged at lattice positions and interlattice positions of a crystal structure of the composite oxide (RhZrCeNdO, RhZrXO or RhZrO). That is, the catalytic metal of Rh is arranged on a surface and in an inside of the composite oxide (RhZrCeNdO, RhZrXO or RhZrO) in an evenly dispersed state.

In this embodiment, a catalyst powder having a catalytic metal of Rh loaded on an oxide containing Zr or a composite oxide containing Zr and Nd. This catalyst powder loaded with the catalytic metal of Rh was prepared through the following process.

An acidic solution containing Zr, or an acidic solution containing Zr and Nd, was used as a raw material. Then, aqueous ammonia was added to the acidic solution as the raw material while stirring the acidic solution to prepare a composite-oxide precursor by a coprecipitation method using aqueous ammonia. Through this process, the metals contained in the raw material were coprecipitated as a metal hydroxide to obtain an amorphous composite-oxide precursor.

The solution containing the composite-oxide precursor and becoming clouded due to the addition of the aqueous ammonia was left for 24 hours, and then a resulting sediment was centrifugalized. Subsequently, a cake obtained by removing supernatent was sufficiently rinsed with water, and the rinsed cake was heated and calcined in air. This calcination was performed at a temperature of 500° C. for a holding time of 10 hours.

An oxide powder obtained in the above manner was mixed in a nitric acid solution containing Rh, and the obtained mixture was subjected to evaporation to dryness. After the evaporation to dryness, the oxide was heated and calcined in air. This calcination was performed at a temperature of 500° C. for a holding time of 10 hours. Through the above process, a catalyst powder having a catalytic metal of Rh loaded on an oxide containing Zr or a composite oxide containing Zr and Nd. In this catalyst powder, the catalytic metal of Rh is arranged only on a surface of the oxide or the composite oxide in a dispersed state.

(2) Preparation of Honeycomb-Supported Catalyst

Figure 2:
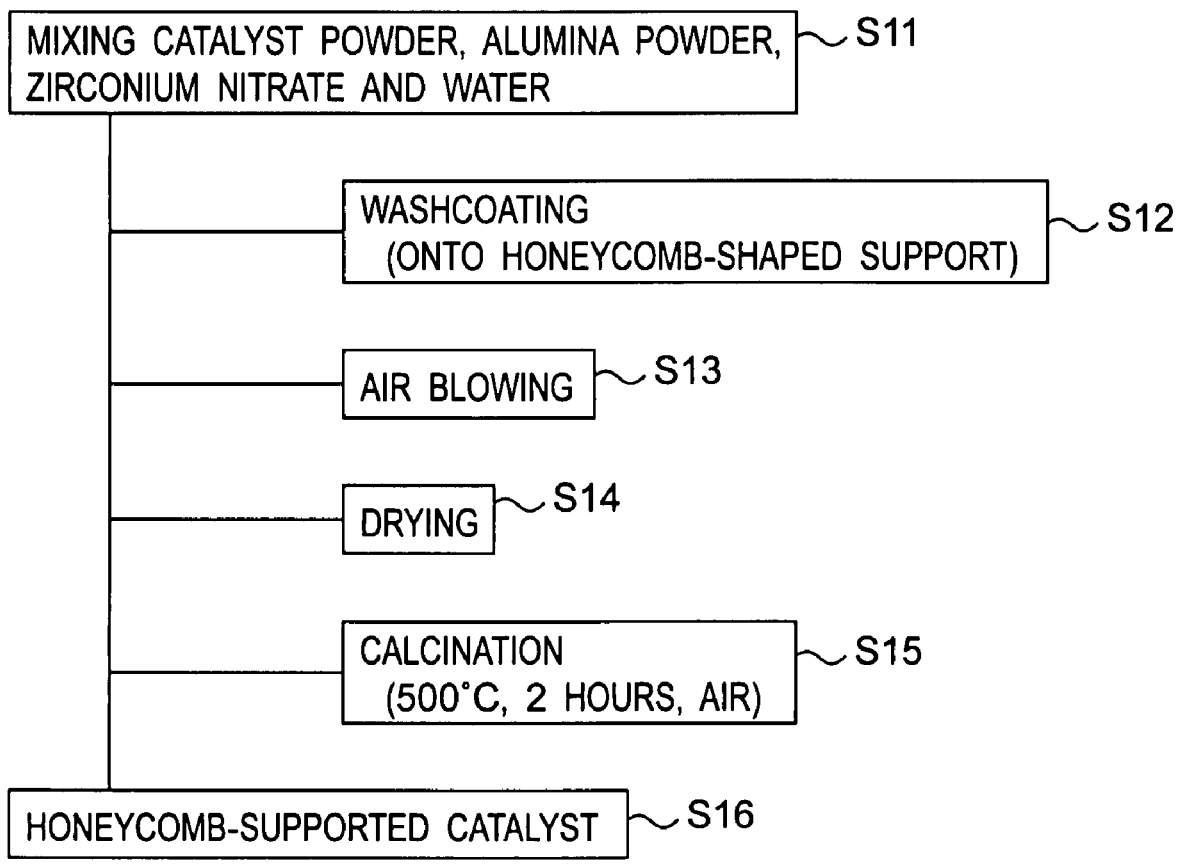
FIG. 2 is an explanatory diagram showing a process of coating a honeycomb-shaped support with catalyst powders (A) and (B).

A process of coating a honeycomb-shaped support with the catalyst powders (A) and (B) to prepare a honeycomb-supported catalyst for evaluating a catalytic conversion efficiency will be described below. FIG. 2 is an explanatory diagram showing the process of coating a honeycomb-shaped support with the catalyst powders (A) and (B). In this embodiment, a catalyst layer is formed by mixing the catalyst powders (A) and (B). Thus, as shown in FIG. 2, the catalyst powder (A), the catalyst powder (B), an alumina powder, zirconium nitrate and water were mixed together to prepare a slurry (Step S11).

Then, in a washcoating step S12, a honeycomb-shaped support was washcoated with the slurry. Specifically, the honeycomb-shaped support was immersed in the slurry to form a catalyst layer comprising a combination of the catalyst powder (A) and the catalyst powder (B) on a surface of the honeycomb-shaped support. Then, in an air-blowing step S13, an excess part of the slurry attached on the surface of the honeycomb-shaped support was blown using an air blower. After the air-blowing step S13, in a drying step S14, the honeycomb-shaped support was dried.

Subsequently, the washcoating step S12, the air-blowing step S13 and the drying step S14 were repeatedly performed until a predetermined amount of catalyst layer was formed on the honeycomb-shaped support. After predetermined amount of catalyst layer was formed on the honeycomb-shaped support, in a calcination step S15, the honeycomb-shaped support was heated and calcined in air. This calcination was performed at a temperature of 500° C. for a holding time of 2 hours. In this manner, a honeycomb-supported catalyst for evaluating a catalytic conversion efficiency was obtained (Step S16). The honeycomb-shaped support has a wall thickness of 4 mil, a cell density of 400 cpsi, a diameter of 25 mm, and a length of 50 mm.

A combination of the catalyst powder (A) and the catalyst powder (B) for catalysts used as Examples in this embodiment is shown in Table 1. Table 1 shows a composition of components of each of the catalyst powder (A) and the catalyst powder (B), and each mixing ratio of the components, wherein the mass ratio of the metals except Rh is represented on the basis of oxide conversion.

TABLE 1

| | Composition of Catalyst Powder (B) | Composition of Catalyst Powder (A) |
|---|---|---|
| Example 1a | Rh/Zr/Pr = 0.36/96/4 wt % | Rh/Zr/Ce/Nd = 0.36/67.5/22.5/10.0 wt % |
| Example 1b | Rh/Zr/Pr = 0.36/92/8 wt % | |
| Example 1c | Rh/Zr/Pr = 0.36/84/16 wt % | |
| Example 1d | Rh/Zr/Pr = 0.36/68/32 wt % | |
| Example 2 | Rh/Zr/Nd = 0.36/84/16 wt % | |
| Example 3 | Rh/Zr/La = 0.36/84/16 wt % | |
| Example 4 | Rh/Zr/Sm = 0.36/84/16 wt % | |
| Example 5 | Rh/Zr/Y = 0.36/84/16 wt % | |
| Example 6 | Rh/Zr/Yb = 0.36/84/16 wt % | |
| Example 7 | Rh/Zr = 0.36/100 wt % | |
| Example 8 | Rh/Zr/Nd = 0.36/84/16 wt % (Rh loaded powder) | |
| Example 9 | Rh/Zr = 0.36/100 wt % (Rh loaded powder) | |

As shown in Table 1, a common composite oxide (RhZrCeNdO) containing Rh, Zr, Ce and Nd was used as respective catalyst powders (A) for Example 1 (Examples 1a to 1d) to Example 9. In each of Examples 1 to 9, a different catalyst powder (B) was mixed with the catalyst powder (A). Specifically, a composite oxide (RhZrPrO) containing Rh, Zr and Pr was used in Example 1 (Examples 1a to 1d), and a composite oxide (RhZrNdO) containing Rh, Zr and Nd was used in Example 2. A composite oxide (RhZrLaO) containing Rh, Zr and La was used in Example 3, and a composite oxide (RhZrSmO) containing Rh, Zr and Sm was used in Example 4. A composite oxide (RhZrYO) containing Rh, Zr and Y was used in Example 5, and a composite oxide (RhZrYbO) containing Rh, Zr and Yb was used in Example 6. A composite oxide (RhZrO) containing Rh and Zr was used in Example 7. The composite oxide [RhZrNdO (Rh loaded powder)] prepared by being loaded Rh on a composite oxide containing Zr and Nd was used in Example 8, and the oxide [RhZrO (Rh loaded powder)] prepared by being loaded Rh on an oxide containing Zr was used in Example 9.

In Example 1 (Examples 1a to 1d), four types of catalysts each having a different mixing ratio between Zr and Pr in the composite oxide containing Zr and Pr were used. Specifically, four types of catalyst powders (B) containing Zr and Pr in such a manner that a ratio of a mass of $Pr_6O_{11}$ to a total mass of $ZrO_2$ and $Pr_6O_{11}$ is 4%, 8%, 16% and 32% on the basis of oxide conversion were used in Example 1a, Example 1b, Example 1c and Example 1d, respectively. In Examples 2 to 6 and Example 8, a catalyst powder (B) containing Zr, and a rare-earth metal except Ce, i.e., any one of Nd, La, Sm, Y and Yb, in such a manner that a ratio of a mass of an oxide of the rare-earth metal to a total mass of $ZrO_2$ and the oxide of the rare-earth metal is 16% on the basis of oxide conversion was used. Rh was contained in the catalyst powder (A) at an amount of 0.36 wt % with respect to a composite oxide of ZrCeNdO, and contained in the catalyst powder (B) at an amount of 0.36 wt %, for example, with respect to a composite oxide of ZrPrO.

As above, in each of Examples comprising the combination of the catalyst powder (A) and the catalyst powder (B), four types of catalysts were prepared in such a manner that a mass of the catalyst powder (B) to a total mass of the catalyst powder (A) and the catalyst powder (B) is 10%, 25%, 40% and 50%, and HC, CO and NOx conversion efficiencies in the catalysts were evaluated. Further, a catalyst consisting only of a catalyst powder (A) in which a mass of a catalyst powder (B) to a total mass of the catalyst powder (A) and the catalyst powder (B) is zero %, and a catalyst consisting only of a catalyst powder (B) in which a mass of the catalyst powder (B) to a total mass of a catalyst powder (A) and the catalyst powder (B) is 100%, were used as Comparative Examples.

(3) Evaluation of Catalytic Conversion Efficiencies

Each of the honeycomb-supported catalysts in Examples 1 to 9 and Comparative Examples were subjected to an aging treatment in air at a temperature 1000° C. for a holding time of 24 hours. Then, exhaust gas conversion efficiencies, specifically light-off performances, were evaluated. In this embodiment, respective light-off temperatures relating to HC, CO and NOx conversion efficiencies (hereinafter referred to respectively as "HC light-off temperature" "CO light-off temperature" and "NOx light-off temperature") were measured using a model-gas flow reactor and an exhaust emission analyzer. The light-off temperature means a temperature of gas at a time when a HC, CO or NOx conversion efficiency reaches 50% under the condition that a temperature of model gas to be supplied to the catalyst reaches is gradually increased from an ambient temperature.

In the evaluation of the light-off performances, a pre-conditioning operation was firstly performed to stabilize measurement conditions. Specifically, the honeycomb-supported catalyst subjected to the aging treatment was attached to the model-gas flow reactor, and a model gas having a temperature of 600° C. and a theoretical air-fuel ratio (A/F=14.7) was supplied to the catalyst for 20 minutes. In the pre-conditioning operation, the model gas was set to have a space velocity SV of 120000/hour and a temperature rising rate of 30° C./min. Table 2 shows a composition of the model gas used in the pre-condition operation.

TABLE 2

| A/F | 13.8 | 14.7 | 15.6 |
|---|---|---|---|
| $C_3H_6$ (ppm) | 541 | 555 | 548 |
| CO (%) | 2.35 | 0.60 | 0.59 |
| NO (ppm) | 975 | 1000 | 980 |
| $CO_2$ (%) | 13.55 | 13.90 | 13.73 |
| $H_2$ (%) | 0.85 | 0.20 | 0.20 |
| $O_2$ (%) | 0.58 | 0.60 | 1.85 |
| $H_2O$ (%) | | 10 (by volume) | |
| $N_2$ | | Balanced | |

In the evaluation of light-off performances, an air-fuel (A/F) ratio of the model gas was set at 14.7±0.9. Specifically, a mainstream gas having a theoretical A/F ratio of 14.7 was constantly supplied, and a predetermined amount of variational gas as shown in Table 2 was pulsedly added at a constant frequency (1 Hz) to forcibly fluctuate the A/F at a magnitude of ±0.9. In this measurement, the model gas was set to have a space velocity SV of 60000/hour and a temperature rising rate of 30° C./min.

FIGS. 3 to 11 show measurement results of HC, CO and NOx light-off temperatures of the respective honeycomb-supported catalysts in Examples.

Figure 3:
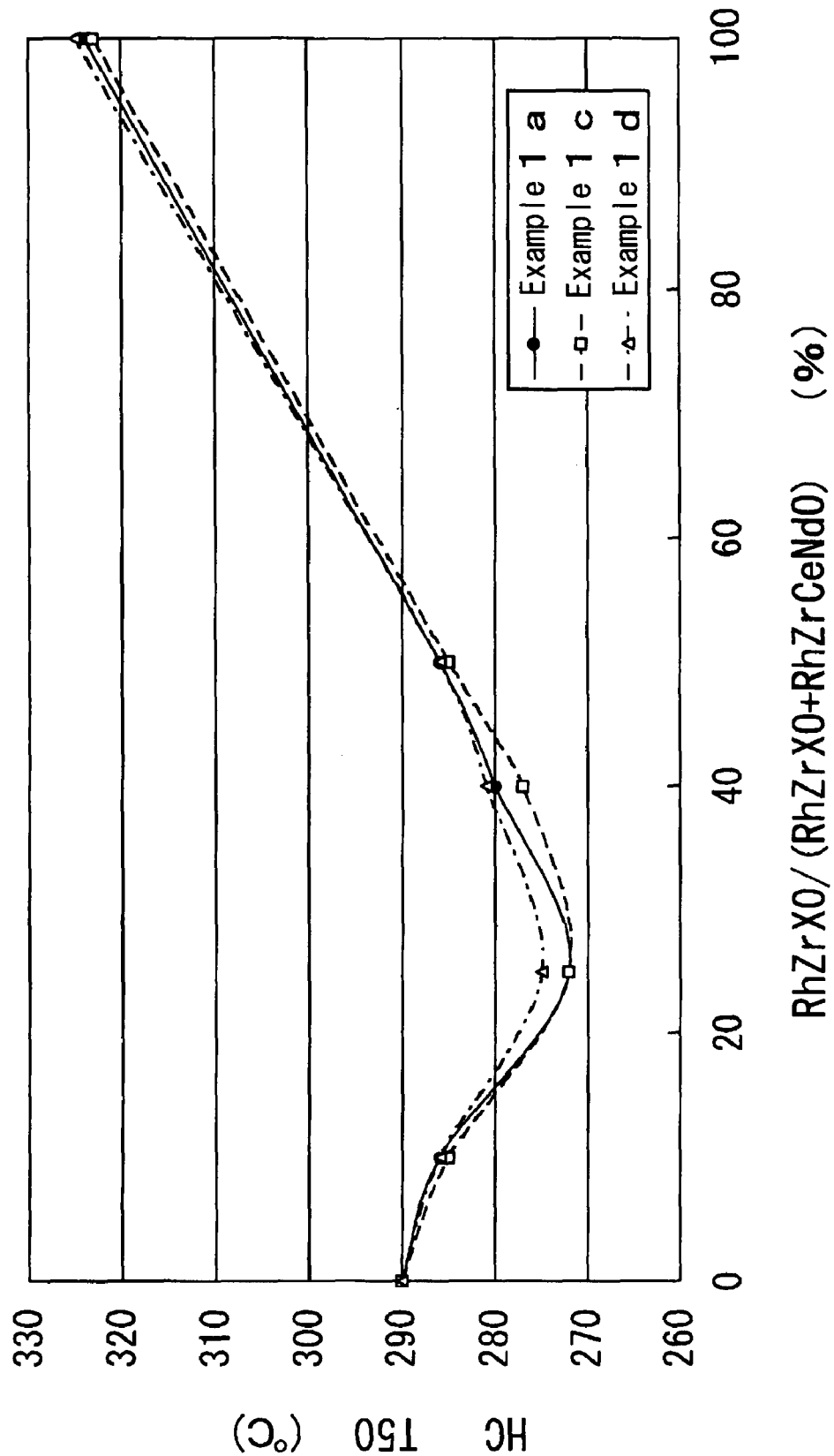
FIG. 3 is a graph showing a measurement result of a light-off temperature relating to a HC conversion efficiency of a catalyst in each of Example 1a, Example 1c and Example 1d.
Figure 4:
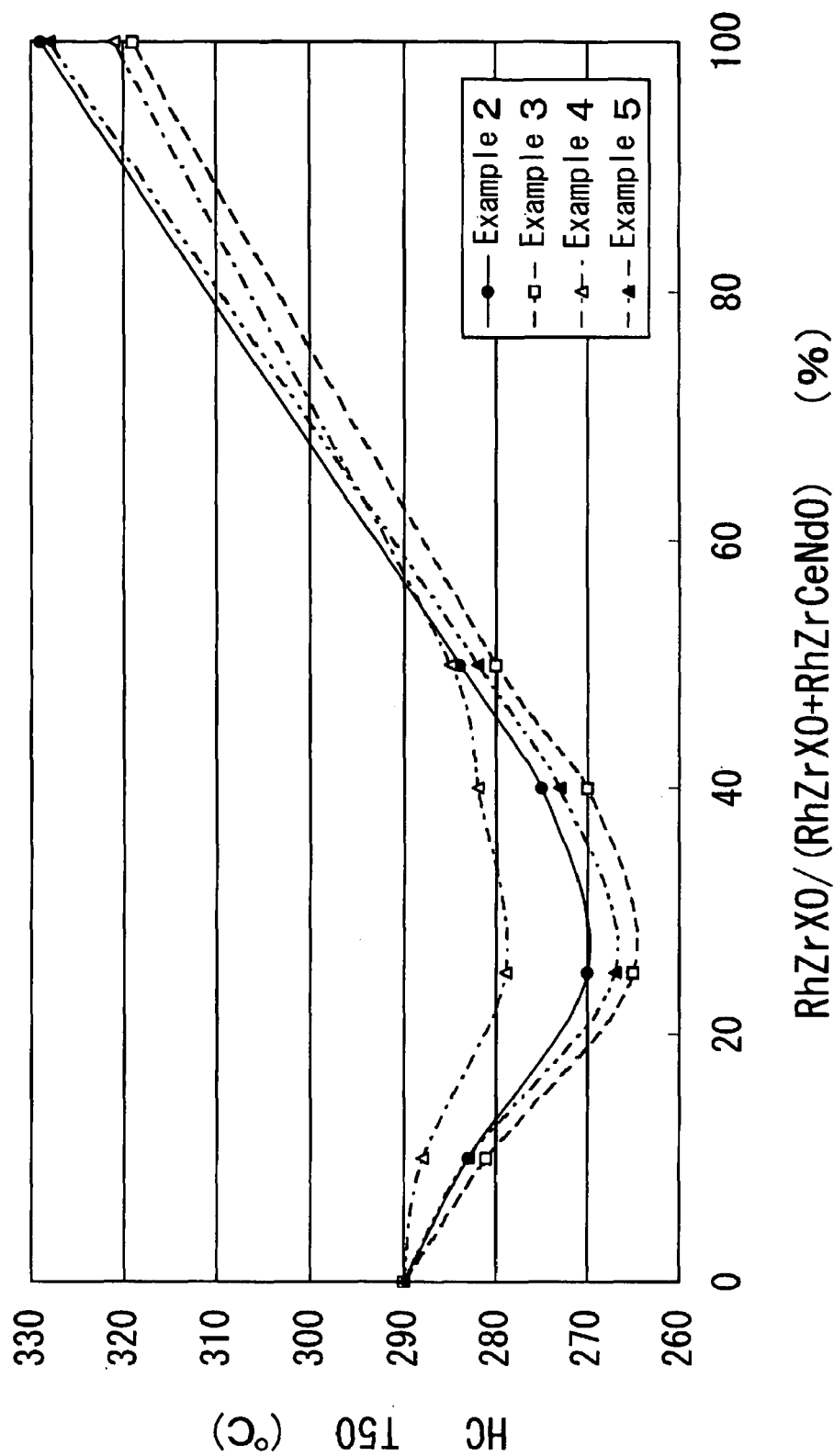
FIG. 4 is a graph showing a measurement result of a light-off temperature relating to a HC conversion efficiency of a catalyst in each of Example 2 to Example 5.
Figure 5:
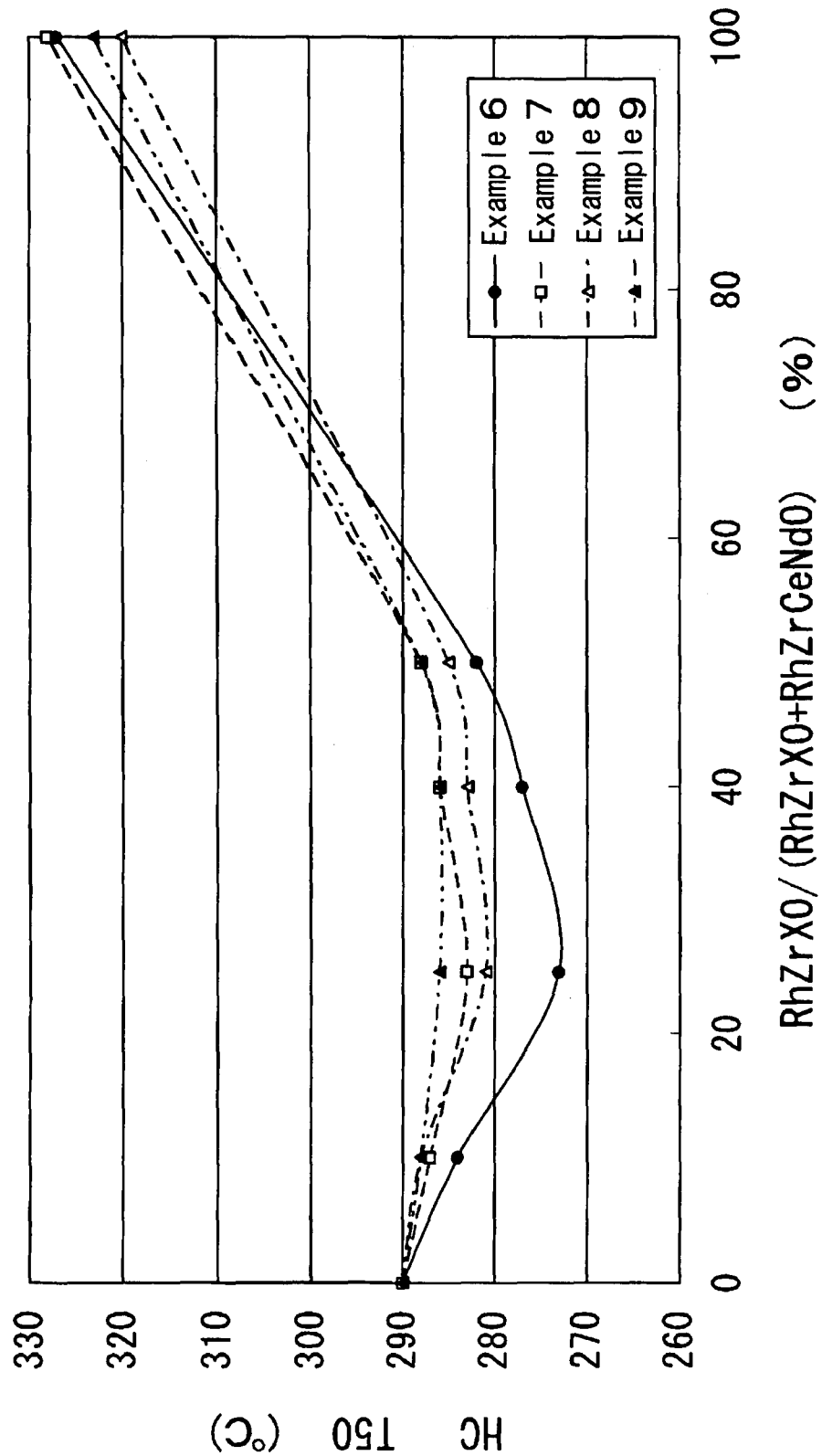
FIG. 5 is a graph showing a measurement result of a light-off temperature relating to a HC conversion efficiency of a catalyst in each of Example 6 to Example 9.

FIG. 3 is a graph showing a measurement result of a HC light-off temperature of the catalyst in each of Example 1a, Example 1c and Example 1d, and FIG. 4 is a graph showing a measurement result of a HC light-off temperature of a catalyst in each of Example 2 to Example 5. FIG. 5 is a graph showing a measurement result of a HC light-off temperature of a catalyst in each of Example 6 to Example 9.

In FIGS. 3 to 5, the horizontal axis represents a ratio [RhZrXO/(RhZrXO+RhZrCeNdO)] of a mass of a composite oxide (RhZrXO) containing Rh, Zr and an rare-earth metal X except Ce to a total mass of the composite oxide (RhZrXO) containing Rh, Zr and an rare-earth metal X except Ce, and the composite oxide (RhZrCeNdO) containing Rh, Zr, Ce and Nd, and a vertical axis represents a HC light-off temperature. The catalyst in Examples 7 and 9 contains no rare-earth metal X. Thus, in place of the composite oxide (RhZrXO) containing Rh, Zr and an rare-earth metal X except Ce, the composite oxide (RhZrO) containing Rh and Zr was used in Example 7, and the oxide [RhZrO (Rh loaded powder)] prepared by being loaded Rh on an oxide containing Zr was used in Example 9.

As shown in FIG. 3, in regard to the HC light-off temperature, as compared with the catalyst consisting only of the catalyst powder (A) or the catalyst powder (B), the catalyst in each of Examples 1a, 1c and 1d exhibits a lower HC light-off temperature by virtue of the combination of the catalyst powder (A) and the catalyst powder (B).

When the ratio of the mass of the catalyst powder (B) to the total mass of the catalyst powder (A) and the catalyst powder (B) is in the range of 1 to 50%, or in the range of 10 to 40%, the catalyst in each of Examples 1a, 1c and 1d exhibits a lower HC light-off temperature as compared with the catalyst consisting only of the catalyst powder (A) serving as an oxygen-storage material, i.e., the catalyst in which the above ratio is zero %. Further, the HC light-off temperature becomes lowest when the ratio is 25%.

As shown in FIG. 4, in regard to the HC light-off temperature, as compared with the catalyst consisting only of the catalyst powder (A) or the catalyst powder (B), the catalyst in each of Examples 2, 3, 4 and 5 also exhibits a lower HC light-off temperature by virtue of the combination of the catalyst powder (A) and the catalyst powder (B).

When the ratio of the mass of the catalyst powder (B) to the total mass of the catalyst powder (A) and the catalyst powder (B) is in the range of 1 to 50%, or in the range of 10 to 40%, the catalyst in each of Examples 2, 3, 4 and 5 exhibits a lower HC light-off temperature as compared with the catalyst consisting only of the catalyst powder (A), i.e., the catalyst in which the above ratio is zero %. Further, the HC light-off temperature becomes lowest when the ratio is 25%.

As shown in FIG. 5, in regard to the HC light-off temperature, as compared with the catalyst consisting only of the catalyst powder (A) or the catalyst powder (B), the catalyst in each of Examples 6 and 7 also exhibits a lower HC light-off temperature by virtue of the combination of the catalyst powder (A) and the catalyst powder (B).

When the ratio of the mass of the catalyst powder (B) to the total mass of the catalyst powder (A) and the catalyst powder (B) is in the range of 1 to 50%, or in the range of 10 to 40%, the catalyst in each of Examples 6 and 7 exhibits a lower HC light-off temperature as compared with the catalyst consisting only of the catalyst powder (A), i.e., the catalyst in which the above ratio is zero %. Further, the HC light-off temperature becomes lowest when the ratio is 25%.

Further, as shown in FIG. 5, in regard to the HC light-off temperature, as compared with the catalyst consisting only of the catalyst powder (A) or the catalyst powder (B), the catalyst in each of Examples 8 and 9 also exhibits a lower HC light-off temperature by virtue of the combination of the catalyst powder (A) and the catalyst powder (B).

When the ratio of the mass of the catalyst powder (B) to the total mass of the catalyst powder (A) and the catalyst powder (B) is in the range of 1 to 50%, or in the range of 10 to 40%, the catalyst in each of Examples 8 and 9 exhibits a lower HC light-off temperature as compared with the catalyst consisting only of the catalyst powder (A), i.e., the catalyst in which the above ratio is zero %. Further, in the catalyst in Example 8, the HC light-off temperature becomes lowest when the ratio is 25%. In the catalyst in Example 9, the HC light-off temperature also becomes lowest when the ratio is 25%.

In view of these measurement results, it is considered that the above ratio is preferably in the range of 1 to 50%, more preferably in the range of 10 to 40%, so as to include 25%.

Comparing between Example 2 where the catalyst powder (B) consists of a composite oxide containing Rh and Example 8 where Rh is loaded on a Zr-based composite oxide, Example 2 exhibits a better HC light-off performance than Example 8. The reason would be that, in Example 2, Rh as a catalytic metal is fixed as a part of the composite oxide, and therefore can avoid being sintered even during the aging treatment. This tendency can also be observed in a comparison between Example 7 and Example 9, and in the following light-off performances for CO and NOx. However, it should be understood that the present invention does not exclude the catalyst having Rh loaded on a Zr-based oxide or $ZrO_2$.

Figure 6:
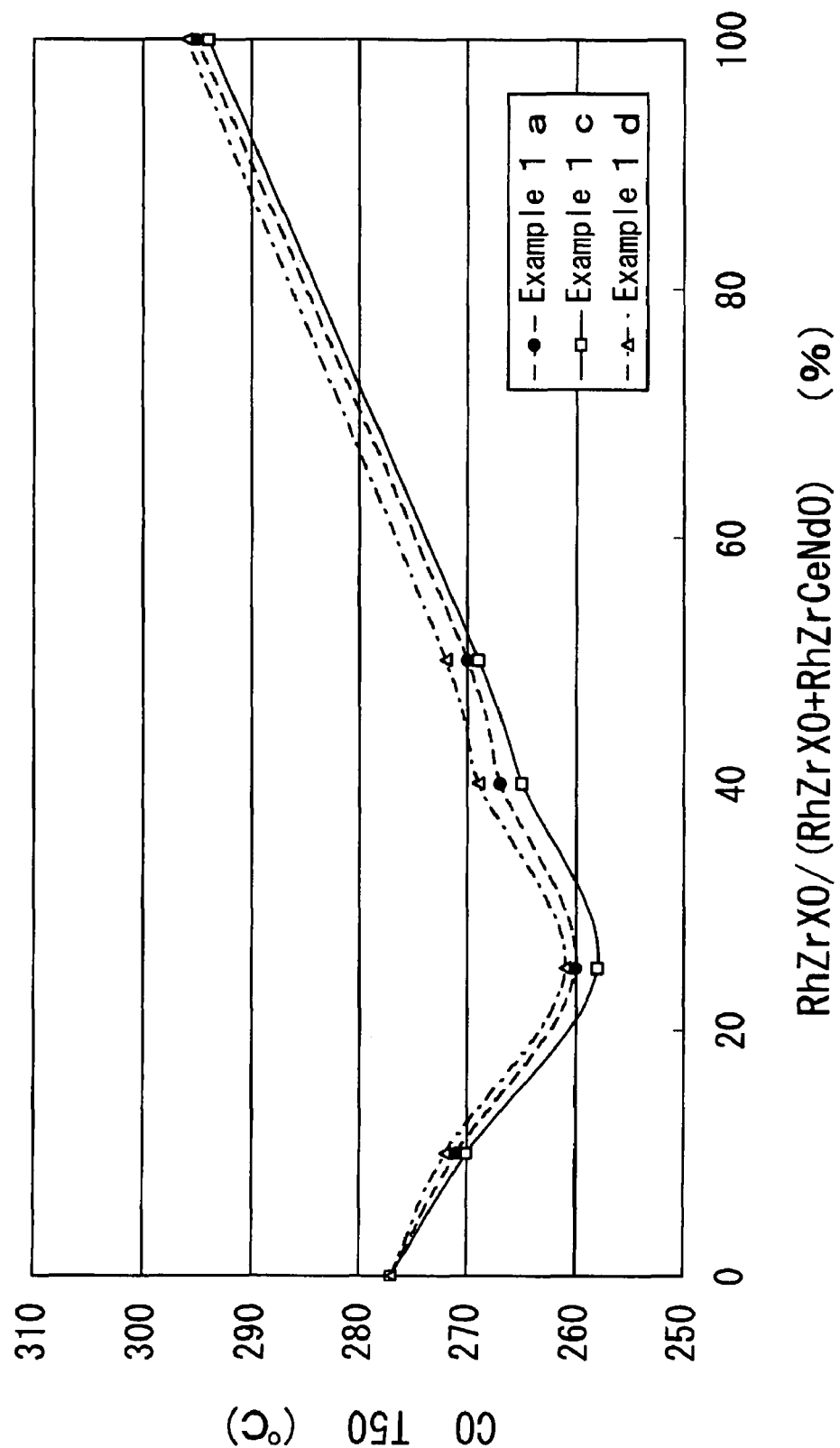
FIG. 6 is a graph showing a measurement result of a light-off temperature relating to a CO conversion efficiency of a catalyst in each of Example 1a, Example 1c and Example 1d.
Figure 7:
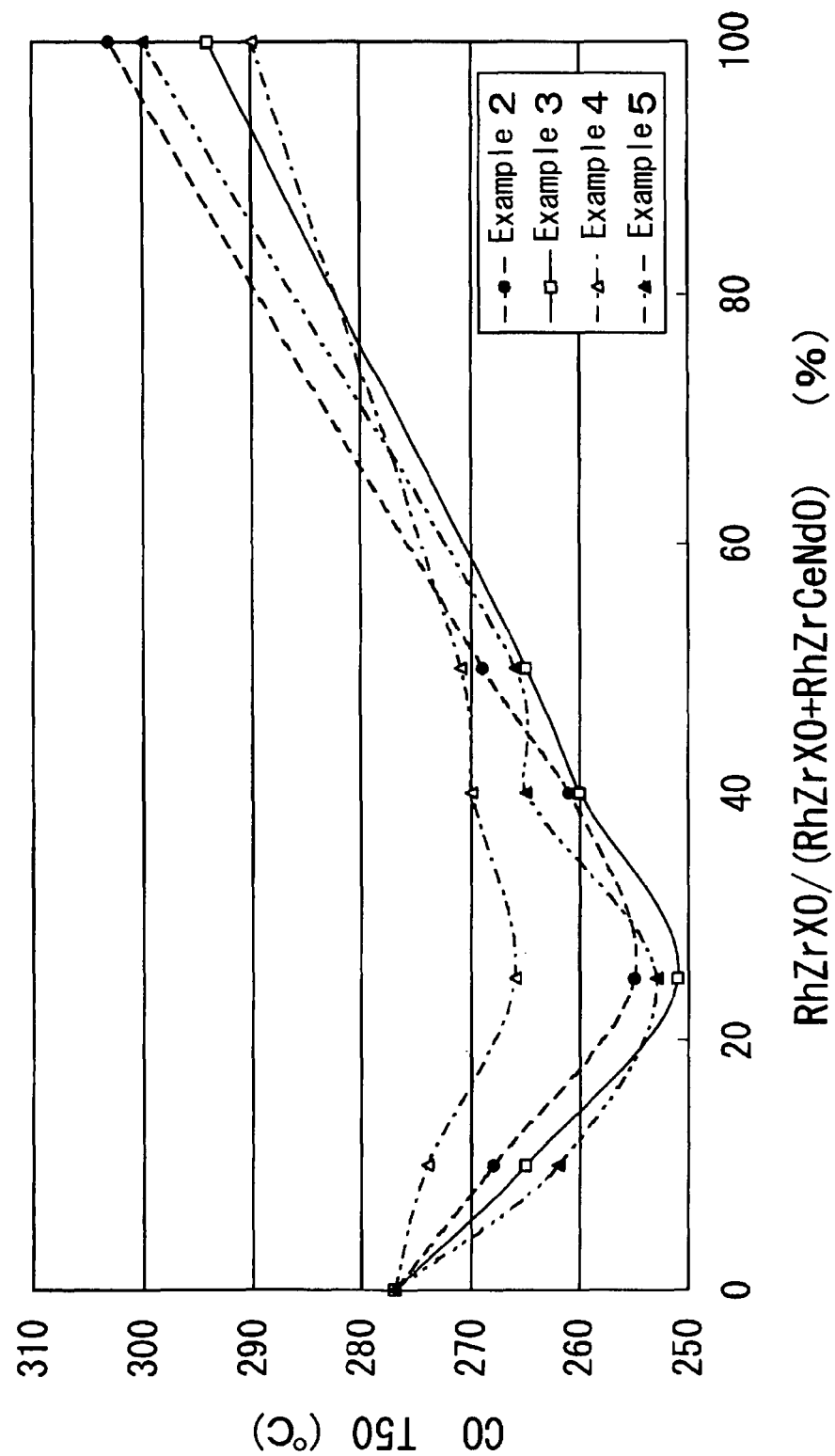
FIG. 7 is a graph showing a measurement result of a light-off temperature relating to a CO conversion efficiency of a catalyst in each of Example 2 to Example 5.
Figure 8:
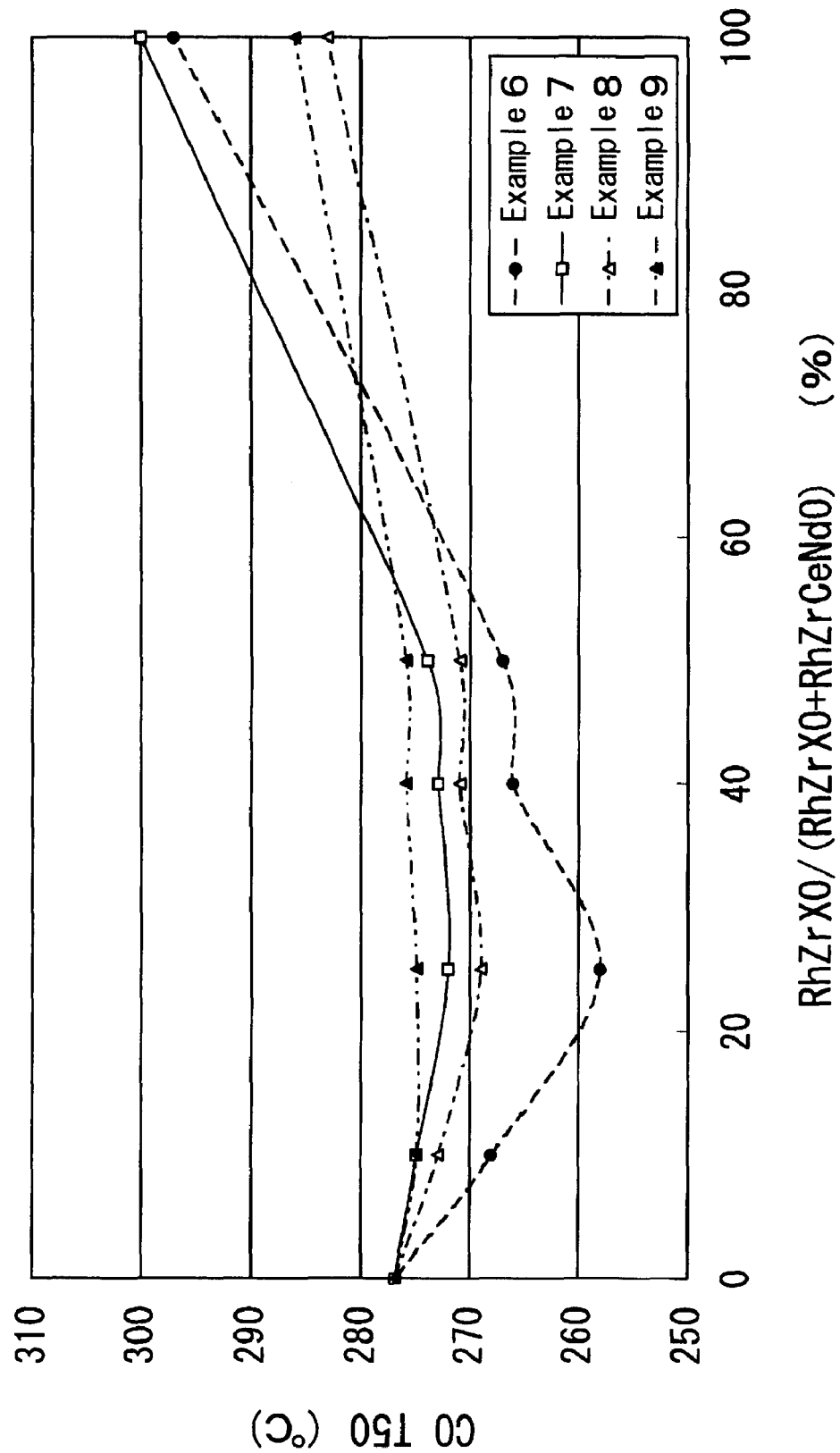
FIG. 8 is a graph showing a measurement result of a light-off temperature relating to a CO conversion efficiency of a catalyst in each of Example 6 to Example 9.

FIG. 6 is a graph showing a measurement result of a CO light-off temperature of the catalyst in each of Example 1a, Example 1c and Example 1d, and FIG. 7 is a graph showing a measurement result of a CO light-off temperature of the catalyst in each of Example 2 to Example 5. FIG. 8 is a graph showing a measurement result of a CO light-off temperature of a catalyst in each of Example 6 to Example 9.

In FIGS. 6 to 8, the horizontal axis represents a ratio [RhZrXO/(RhZrXO+RhZrCeNdO)] of a mass of a composite oxide (RhZrXO) containing Rh, Zr and an rare-earth metal X except Ce to a total mass of the composite oxide (RhZrXO) containing Rh, Zr and an rare-earth metal X except Ce, and the composite oxide (RhZrCeNdO) containing Rh, Zr, Ce and Nd, and a vertical axis represents a CO light-off temperature. The catalyst in Examples 7 and 9 contains no rare-earth metal X. Thus, in place of the composite oxide (RhZrXO) containing Rh, Zr and an rare-earth metal X except Ce, the composite oxide (RhZrO) containing Rh and Zr was used in Example 7, and the oxide [RhZrO (Rh loaded powder)] prepared by being loaded Rh on an oxide containing Zr was used in Example 9.

As shown in FIG. 6, in regard to the CO light-off temperature, as compared with the catalyst consisting only of the catalyst powder (A) or the catalyst powder (B), the catalyst in each of Examples 1a, 1c and 1d exhibits a lower CO light-off temperature by virtue of the combination of the catalyst powder (A) and the catalyst powder (B).

When the ratio of the mass of the catalyst powder (B) to the total mass of the catalyst powder (A) and the catalyst powder (B) is in the range of 1 to 50%, or in the range of 10 to 40%, the catalyst in each of Examples 1a, 1c and 1d exhibits a lower CO light-off temperature as compared with the catalyst consisting only of the catalyst powder (A) serving as an oxygen-storage material, i.e., the catalyst in which the above ratio is zero %. Further, the CO light-off temperature becomes lowest when the ratio is 25%.

As shown in FIG. 7, in regard to the CO light-off temperature, as compared with the catalyst consisting only of the catalyst powder (A) or the catalyst powder (B), the catalyst in each of Examples 2, 3, 4 and 5 also exhibits a lower CO light-off temperature by virtue of the combination of the catalyst powder (A) and the catalyst powder (B).

When the ratio of the mass of the catalyst powder (B) to the total mass of the catalyst powder (A) and the catalyst powder (B) is in the range of 1 to 50%, or in the range of 10 to 40%, the catalyst in each of Examples 2, 3, 4 and 5 exhibits a lower CO light-off temperature as compared with the catalyst consisting only of the catalyst powder (A), i.e., the catalyst in which the above ratio is zero %. Further, the CO light-off temperature becomes lowest when the ratio is 25%.

As shown in FIG. 8, in regard to the CO light-off temperature, as compared with the catalyst consisting only of the catalyst powder (A) or the catalyst powder (B), the catalyst in each of Examples 6 and 7 also exhibits a lower CO light-off temperature by virtue of the combination of the catalyst powder (A) and the catalyst powder (B).

When the ratio of the mass of the catalyst powder (B) to the total mass of the catalyst powder (A) and the catalyst powder (B) is in the range of 1 to 50%, or in the range of 10 to 40%, the catalyst in each of Examples 6 and 7 exhibits a lower CO light-off temperature as compared with the catalyst consisting only of the catalyst powder (A), i.e., the catalyst in which the above ratio is zero %. Further, the CO light-off temperature becomes lowest when the ratio is 25%.

Further, as shown in FIG. 8, in regard to the CO light-off temperature, as compared with the catalyst consisting only of the catalyst powder (A) or the catalyst powder (B), the catalyst in each of Examples 8 and 9 also exhibits a lower CO light-off temperature by virtue of the combination of the catalyst powder (A) and the catalyst powder (B).

When the ratio of the mass of the catalyst powder (B) to the total mass of the catalyst powder (A) and the catalyst powder (B) is in the range of 1 to 50%, or in the range of 10 to 40%, the catalyst in each of Examples 8 and 9 exhibits a lower CO light-off temperature as compared with the catalyst consisting only of the catalyst powder (A), i.e., the catalyst in which the above ratio is zero %. Further, in the catalyst in Example 8, the CO light-off temperature becomes lowest when the ratio is 25%. In the catalyst in Example 9, the CO light-off temperature also becomes lowest when the ratio is 25%.

In view of these measurement results, it is considered that the above ratio is preferably in the range of 1 to 50%, more preferably in the range of 10 to 40%, so as to include 25%.

Figure 9:
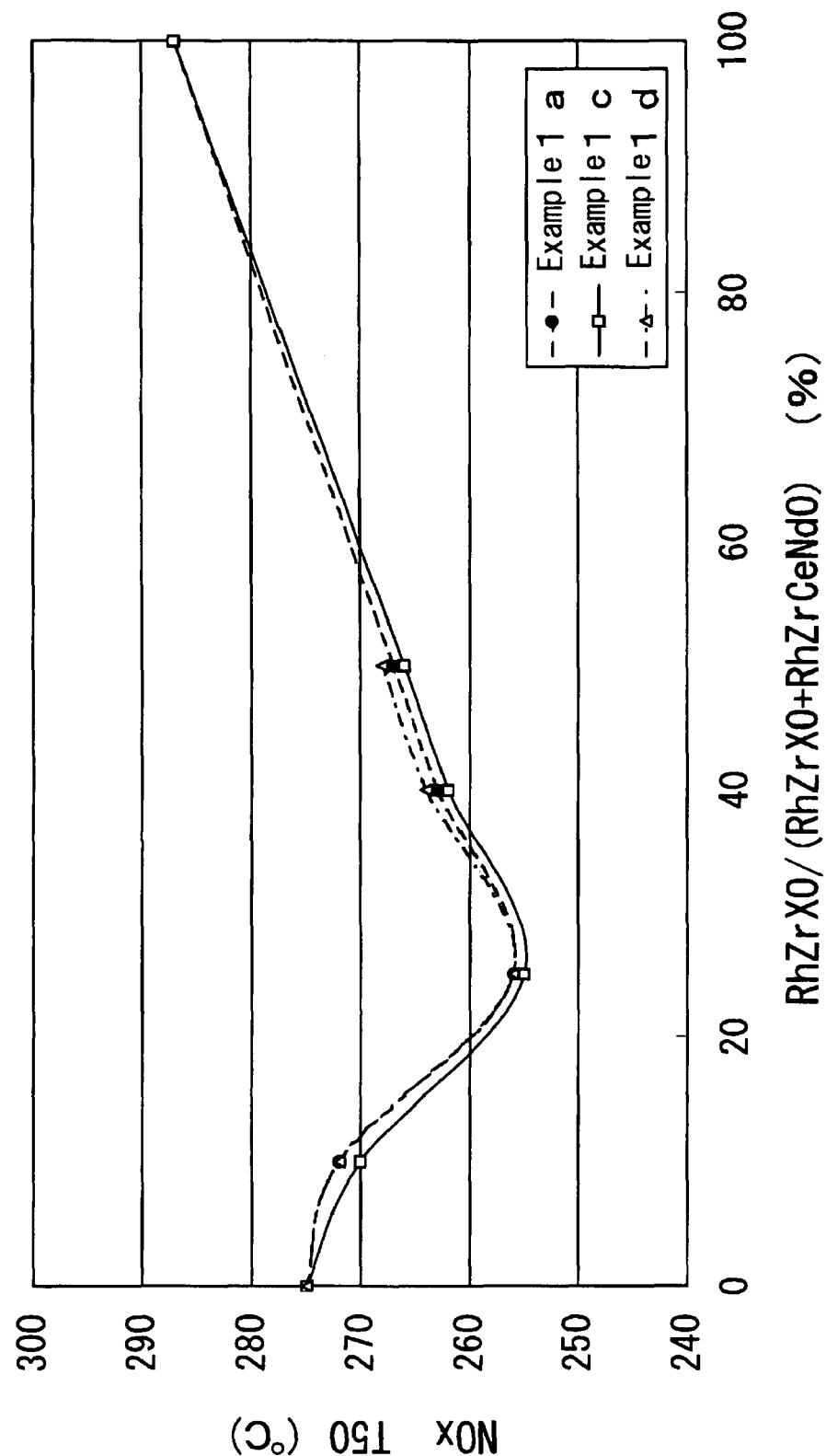
FIG. 9 is a graph showing a measurement result of a light-off temperature relating to a NOx conversion efficiency of a catalyst in each of Example 1a, Example 1c and Example 1d.
Figure 10:
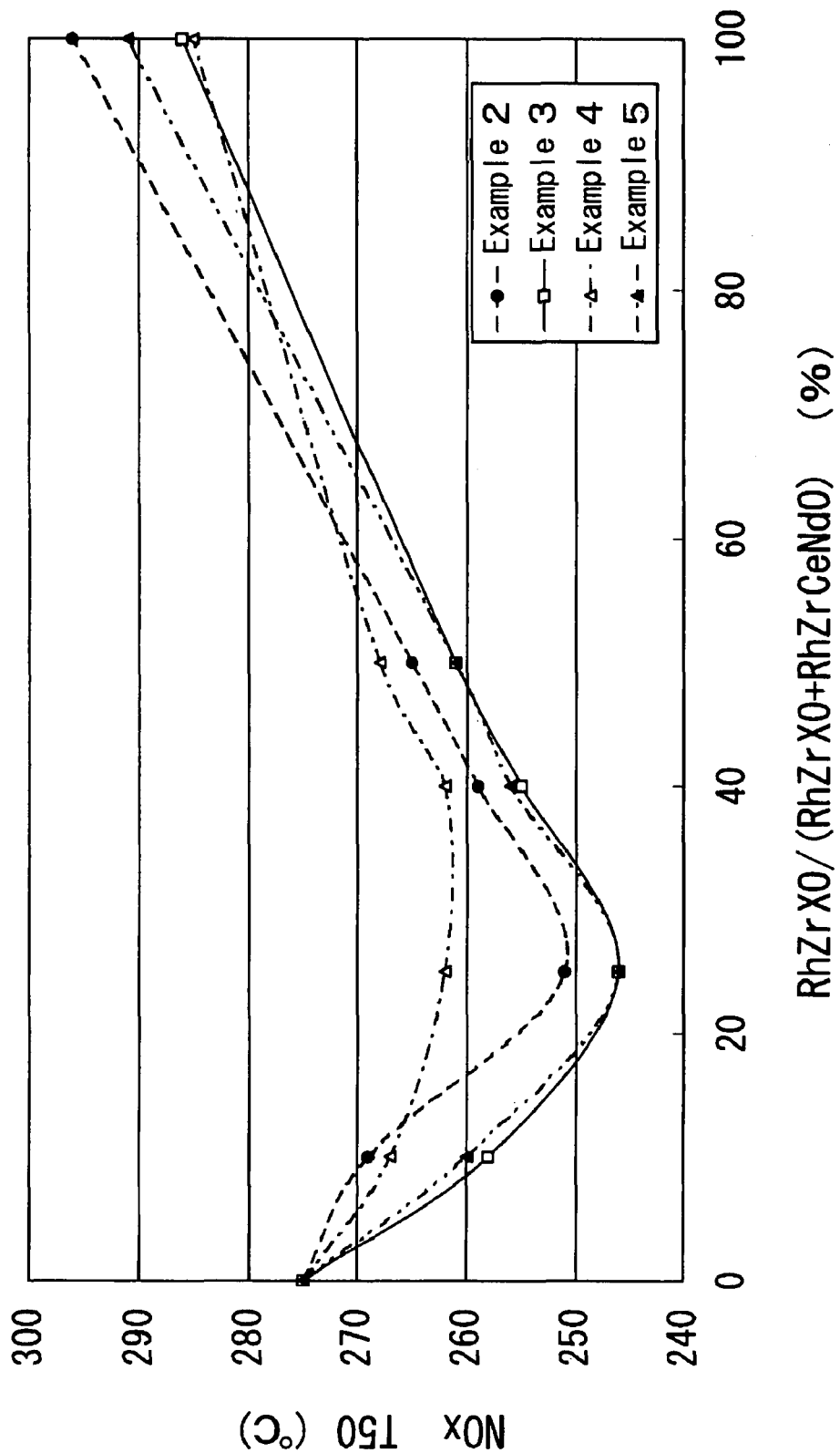
FIG. 10 is a graph showing a measurement result of a light-off temperature relating to a NOx conversion efficiency of a catalyst in each of Example 2 to Example 5.
Figure 11:
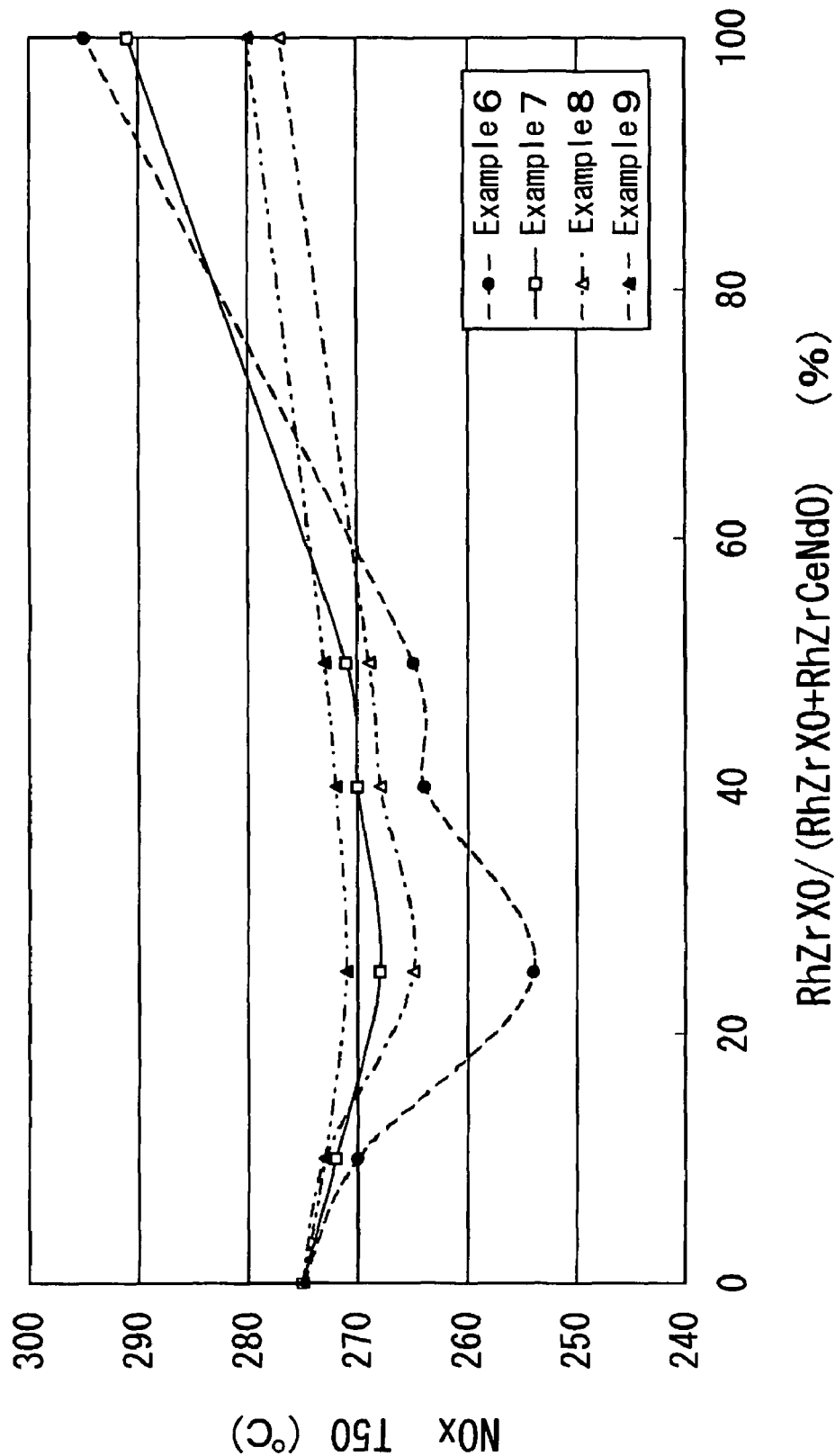
FIG. 11 is a graph showing a measurement result of a light-off temperature relating to a NOx conversion efficiency of a catalyst in each of Example 6 to Example 9.

FIG. 9 is a graph showing a measurement result of a NOx light-off temperature of the catalyst in each of Example 1a, Example 1c and Example 1d, and FIG. 10 is a graph showing a measurement result of a NOx light-off temperature of the catalyst in each of Example 2 to Example 5. FIG. 11 is a graph showing a measurement result of a NOx light-off temperature of a catalyst in each of Example 6 to Example 9.

In FIGS. 9 to 11, the horizontal axis represents a ratio [RhZrXO/(RhZrXO+RhZrCeNdO)] of a mass of a composite oxide (RhZrXO) containing Rh, Zr and an rare-earth metal X except Ce to a total mass of the composite oxide (RhZrXO) containing Rh, Zr and an rare-earth metal X except Ce, and the composite oxide (RhZrCeNdO) containing Rh, Zr, Ce and Nd, and a vertical axis represents a NOx light-off temperature. The catalyst in Examples 7 and 9 contains no rare-earth metal X. Thus, in place of the composite oxide (RhZrXO) containing Rh, Zr and an rare-earth metal X except Ce, the composite oxide (RhZrO) containing Rh and Zr was used in Example 7, and the oxide [RhZrO (Rh loaded powder)] prepared by being loaded Rh on an oxide containing Zr was used in Example 9.

As shown in FIG. 9, in regard to the NOx light-off temperature, as compared with the catalyst consisting only of the catalyst powder (A) or the catalyst powder (B), the catalyst in each of Examples 1a, 1c and 1d exhibits a lower NOx light-off temperature by virtue of the combination of the catalyst powder (A) and the catalyst powder (B).

When the ratio of the mass of the catalyst powder (B) to the total mass of the catalyst powder (A) and the catalyst powder (B) is in the range of 1 to 50%, or in the range of 10 to 40%, the catalyst in each of Examples 1a, 1c and 1d exhibits a lower NOx light-off temperature as compared with the catalyst consisting only of the catalyst powder (A) serving as an oxygen-storage material, i.e., the catalyst in which the above ratio is zero %. Further, the NOx light-off temperature becomes lowest when the ratio is 25%.

As shown in FIG. 10, in regard to the NOx light-off temperature, as compared with the catalyst consisting only of the catalyst powder (A) or the catalyst powder (B), the catalyst in each of Examples 2, 3, 4 and 5 also exhibits a lower NOx light-off temperature by virtue of the combination of the catalyst powder (A) and the catalyst powder (B).

When the ratio of the mass of the catalyst powder (B) to the total mass of the catalyst powder (A) and the catalyst powder (B) is in the range of 1 to 50%, or in the range of 10 to 40%, the catalyst in each of Examples 2, 3, 4 and 5 exhibits a lower NOx light-off temperature as compared with the catalyst consisting only of the catalyst powder (A), i.e., the catalyst in which the above ratio is zero %. Further, in the catalyst in each of Example 2, 3 and 5, the NOx light-off temperature becomes lowest when the ratio is 25%. In the catalyst in Example 4, the NOx light-off temperature becomes lowest when the ratio is 25% or 40%.

As shown in FIG. 11, in regard to the NOx light-off temperature, as compared with the catalyst consisting only of the catalyst powder (A) or the catalyst powder (B), the catalyst in each of Examples 6 and 7 also exhibits a lower NOx light-off temperature by virtue of the combination of the catalyst powder (A) and the catalyst powder (B).

When the ratio of the mass of the catalyst powder (B) to the total mass of the catalyst powder (A) and the catalyst powder (B) is in the range of 1 to 50%, or in the range of 10 to 40%, the catalyst in each of Examples 6 and 7 exhibits a lower NOx light-off temperature as compared with the catalyst consisting only of the catalyst powder (A), i.e., the catalyst in which the above ratio is zero %. Further, the NOx light-off temperature becomes lowest when the ratio is 25%.

Further, as shown in FIG. 11, in regard to the NOx light-off temperature, as compared with the catalyst consisting only of the catalyst powder (A) or the catalyst powder (B), the catalyst in each of Examples 8 and 9 also exhibits a lower NOx light-off temperature by virtue of the combination of the catalyst powder (A) and the catalyst powder (B).

When the ratio of the mass of the catalyst powder (B) to the total mass of the catalyst powder (A) and the catalyst powder (B) is in the range of 1 to 50%, or in the range of 10 to 40%, the catalyst in each of Examples 8 and 9 exhibits a lower NOx light-off temperature as compared with the catalyst consisting only of the catalyst powder (A), i.e., the catalyst in which the above ratio is zero %. Further, in the catalyst in Example 8, the NOx light-off temperature becomes lowest when the ratio is 25%. In the catalyst in Example 9, the NOx light-off temperature also becomes lowest when the ratio is 25%.

As above, the catalyst comprising the combination of the catalyst powder (A) consisting of a composite oxide which contains at least Ce, Zr and a catalytic noble metal composition, and the catalyst powder (B) consisting of a Zr-based oxide which contains at least Zr and has Rh existing on a surface thereof makes it possible to lower each of the HC, CO and NOx light-off temperatures, as compared with the catalyst consisting only of a composite oxide containing Rh, Zr, Ce and Nd to serve as an oxygen-storage material. Further, in the catalyst comprising the combination of the catalyst powder (A) and the catalyst powder (B), the ratio of the mass of the catalyst powder (B) to the total mass of the catalyst powder (A) and the catalyst powder (B) is preferably set in the range of 1 to 50%, more preferably in the range of 10 to 40%. In the above Examples, Rh is used as a catalytic noble metal of the catalyst powder (A). Alternatively, any other suitable catalytic noble metal, such as Pt, may be used.

(4) Measurements of BET Specific Surface Area and Average Crystallite Diameter of Zr-Based Oxide In this embodiment, in addition to the above evaluation of the light-off performances, a BET specific surface area in a fresh state (before an aging treatment) and after the aging treatment was measured by a BET method, for each of the catalyst powders used in the above Examples. Table 3 shows the measurement result of a BET specific surface area of the catalyst powder used in each of the above Examples. Further, an average crystallite diameter of the Zr-based oxide of the catalyst powder (B) was measured, and the measurement result is also shown in Table 3. The aging treatment was performed in air at 1000° C. for 24 hours. The average crystallite diameter was obtained by performing an X-ray diffraction measurement and a calculation using the Scherrer formula which is commonly known to those skilled in the art.

TABLE 3

| | Composition of Catalyst Powder (B) | BET Specific Surface Area ($m^2/g$) | | Average Crystallite Diameter (nm) | |
|---|---|---|---|---|---|
| | | fresh | after aging | fresh | after aging |
| Example 1a | Rh/Zr/Pr = 0.36/96/4 wt % | 102 | 25 | — | — |
| Example 1b | Rh/Zr/Pr = 0.36/92/8 wt % | 106 | 32 | — | — |
| Example 1c | Rh/Zr/Pr = 0.36/84/16 wt % | 113 | 32 | 12.0 | 16.0 |
| Example 1d | Rh/Zr/Pr = 0.36/68/32 wt % | 145 | 19 | — | — |
| Example 2 | Rh/Zr/Nd = 0.36/84/16 wt % | 110 | 30 | 11.5 | 17.5 |
| Example 3 | Rh/Zr/La = 0.36/84/16 wt % | 163 | 23 | — | — |
| Example 4 | Rh/Zr/Sm = 0.36/84/16 wt % | 122 | 24 | — | — |
| Example 5 | Rh/Zr/Y = 0.36/84/16 wt % | 116 | 12 | 11.0 | 13.5 |
| Example 6 | Rh/Zr/Yb = 0.36/84/16 wt % | — | — | — | — |
| Example 7 | Rh/Zr = 0.36/100 wt % | 66 | 10 | 13.5 | 31.5 |
| Example 8 | Rh/Zr/Nd = 0.3 6/84/16 wt % (Rh loaded powder) | 124 | 25 | — | — |
| Example 9 | Rh/Zr = 0.36/100 wt % (Rh loaded powder) | 71 | 8 | — | — |

As seen in Table 3, each of the composite oxides used in Example 1 (Examples 1a to 1d) to Example 5 (i.e., RhZrPrO, RhZrNdO, RhZrLaO, RhZrSmO, RhZrYO, RhZrYbO each containing Rh, Zr and a rare-earth metal except Ce) has a larger specific surface area in the fresh state and after the aging treatment, as compared with the composite oxide used in Example 7 (i.e., RhZrO containing Rh and Zr). This shows that the addition of the rare-earth metal to the Rh and Zr-containing composite oxide provides enhanced thermal resistance. In regard to the average crystallite diameter, each of Examples 1c, 2 and 5 has a smaller average crystallite diameter as compared with Example 7. This also shows that the addition of the rare-earth metal provides enhanced thermal resistance.

As to the catalyst powder (B) used in Examples 8 and 9, the composite oxide used in Example 8 which has Rh loaded on a composite oxide containing Zr and Nd has a larger specific surface area in the fresh state and after the aging treatment, as compared with the composite oxide used in Example 9 which has Rh loaded on an oxide containing Zr. This shows that the addition of the rare-earth metal to the oxide having Rh loaded on an oxide containing Zr provides enhanced thermal resistance.

As above, in the exhaust gas purifying catalyst according to this embodiment, the catalyst powder (B) consisting of a Zr-based composite oxide which contains Rh, Zr and a rare-earth metal except Ce, or the catalyst powder (B) consisting of a Zr-based oxide containing Rh and Zr, can be combined with the catalyst powder (A) consisting of a composite oxide which contains Rh, Zr, Ce and Nd to serve as an oxygen-storage material, so as to provide enhanced HC, CO and NOx conversion efficiencies as compared with the catalyst consisting only of the catalyst powder (A).

Specifically, under a rich (oxygen-deficient) exhaust atmosphere, $H_2$ is created on the Zr-based oxide of the catalyst powder (B) through a steam-reforming reaction [see the following chemical formula (1)]. Although NOx is attached on the composite oxide of the catalyst powder (A), which contains at least Ce, Zr, and a catalytic metal composition, a part of the NOx is left on the composite oxide in an attached state, because this composite oxide contributes to enhancement in oxygen storage/releasing capability, but has poor NOx reduction function due to a low amount of the catalytic metal composition exposed on a surface thereof, as mentioned above. This meets a condition for readily inducing a reaction between the above created $H_2$ and the attached NOx, and therefore a NOx reduction reaction is facilitated by the created $H_2$ to convert the NOx into inert emissions. Then, the NOx reduction reaction can generate heat to increase a temperature of the catalyst layer so as to achieve enhanced low-temperature conversion efficiency for HC and CO under assistance of oxygen released from the catalyst powder (A). Thus, the steam-reforming reaction in the catalyst powder (B) can be utilized positively and effectively for the catalyst powder (A) which consists of a composite oxide containing at least Ce, Zr and a catalytic metal composition.

$$HC + H_2O \rightarrow H_2 + CO \qquad (1)$$

More specifically, when only either one of the catalyst powder (B) consisting of a Zr-based composite oxide which contains Rh, Zr and a rare-earth metal except Ce, and the catalyst powder (B) consisting of a Zr-based oxide containing Rh and Zr is used in the exhaust gas purifying catalyst, it is difficult to sufficiently induce a CO oxidation reaction due to lack of $O_2$ as compared with the catalyst using only the catalyst powder (A) consisting of a composite oxide which contains Rh, Zr, Ce and Nd to serve as an oxygen-storage material, even though the Rh existing on the surface of the catalyst powder (B) can facilitate the steam-reforming reaction, i.e., a reaction between HC emissions and water vapor.

In contract, when the catalyst powder (B) consisting of a Zr-based composite oxide which contains Rh, Zr and a rare-earth metal except Ce, or the catalyst powder (B) consisting of a Zr-based oxide containing Rh and Zr, is used in combination with the catalyst powder (A) consisting of a composite oxide which contains Rh, Zr, Ce and Nd to serve as an oxygen-storage material, it is believed that $H_2$ created through the stream-reforming reaction induced by the composite oxide of the catalyst powder (B) which contains Rh, Zr and a rare-earth metal except Ce, or the Zr-based oxide of the catalyst powder (B) which contains Rh and Zr reacts with NO attached on the composite oxide of the catalyst powder (A), and heat generated by the reaction between the $H_2$ and the NO increases a temperature of the catalyst to facilitate exhaust gas conversion into inert emissions.

For example, the exhaust gas conversion reaction includes a CO oxidation reaction. In the exhaust gas purifying catalyst according to this embodiment, it is believed that the stream-reforming reaction based on Rh existing on the surfaces of the Zr-based composite oxide and the Zr-based oxide of the catalyst powder (B) is effectively induced in concurrence with the reaction occurring on the composite oxide of the catalyst powder. (A), to provide enhanced light-off performances relating to HC, CO and NOx conversion efficiencies.

In the exhaust gas purifying catalyst comprising the combination of the catalyst powder (B) consisting of a composite oxide which has Rh loaded on a Zr-based composite oxide containing Zr and Nd or the catalyst powder (B) which has Rh loaded on a Zr-based oxide containing Zr, and the catalyst powder (A) consisting of a composite oxide which contains Rh, Zr, Ce and Nd to serve as an oxygen-storage material, it is believed that the stream-reforming reaction based on Rh existing on the surfaces of the Zr-based composite oxide and the Zr-based oxide of the catalyst powder (B) is effectively induced to provide enhanced light-off performances relating to HC, CO and NOx conversion efficiencies.

Thus, in this embodiment, when the exhaust gas purifying catalyst formed by mixing the catalyst powder (A) consisting of a composite oxide which contains at least Ce, Zr, and a catalytic noble metal composition, and the catalyst powder (B) consisting of a Zr-based oxide which contains at least Zr and has Rh existing on a surface thereof, is used for purifying exhaust gas, HC emissions and water vapor are brought into contact the Zr-based oxide having Rh existing on the surface thereof, so as to create CO and $H_2$, and a reaction between the created $H_2$ and NOx emissions after being attached on the composite oxide of the catalyst powder (A) is induced, so as to reduce the NOx emissions. Thus, a temperature of the exhaust gas purifying catalyst formed by mixing the catalyst powder (A) and the catalyst powder (B) is increased based on heat generated by the NOx reduction reaction, so as to convert CO emissions in exhaust gas and the created CO, into inert emissions through an oxidation reaction.

As above, in the exhaust gas purifying catalyst according to this embodiment, the catalyst layer formed on the honeycomb-shaped support is formed by mixing the catalyst powder (A) consisting of a composite oxide which contains at least Ce, Zr, and a catalytic noble metal composition, and the catalyst powder (B) consisting of a Zr-based oxide which contains at least Zr and has Rh existing on a surface thereof. This makes it possible to improve low-temperature catalytic activity. Specifically, under a rich (oxygen-deficient) exhaust atmosphere, $H_2$ is created on the Zr-based oxide of the catalyst powder (B) through a steam-reforming reaction. Although NOx is attached on the composite oxide of the first catalyst powder (A), which contains at least Ce, Zr, and a catalytic noble metal composition, a part of the NOx is left on the composite oxide in an attached state, because this composite oxide contributes to enhancement in oxygen storage/releasing capability, but has poor NOx reduction function due to a low amount of the catalytic noble metal composition exposed on a surface thereof, as mentioned above. This meets a condition for readily inducing a reaction between the above created $H_2$ and the attached NOx, and therefore a NOx reduction reaction is facilitated by the created $H_2$ to convert the NOx into inert emissions. Then, the NOx reduction reaction can generate heat to increase a temperature of the catalyst layer so as to achieve enhanced low-temperature conversion efficiency for HC and CO under assistance of oxygen released from the catalyst powder (A). Thus, the steam-reforming reaction in the catalyst powder (B) can be utilized positively and effectively for the catalyst powder (A) which consists of a composite oxide containing at least Ce, Zr and a catalytic noble metal composition.

The catalyst powder (B) may consist of a composite oxide containing Zr and Rh. This allows the catalyst powder (B) to effectively achieve the above advantages. In addition, the Rh as a catalytic metal incorporated in the composite oxide as a part thereof can provide enhanced sintering resistance and thermal resistance.

Alternatively, the catalyst powder (B) may consist of a composite oxide which contains Zr as a primary component, a rare-earth metal except Ce, and Rh. This allows the catalyst powder (B) to effectively achieve the above advantages. In addition, the Rh as a catalytic metal incorporated in the composite oxide as a part thereof can provide enhanced sintering resistance and thermal resistance.

Further, the Rh of the second catalyst powder (B) may be carried on the Zr-based oxide containing at least Zr. This allows the catalyst powder (B) to effectively achieve the above advantages.

Further, the Zr-based oxide may additionally contain a rare-earth metal to effectively achieve the advantages.

The ratio of the mass of the catalyst powder (B) to the total mass of the catalyst powder (A) and the catalyst powder (B) may be set in the range of 1 to 50% to effectively achieve the above advantages.

Further, the ratio of the mass of the catalyst powder (B) to the total mass of the catalyst powder (A) and the catalyst powder (B) may be set in the range of 10 to 40% to further effectively achieve the above advantages.

The composite oxide of the catalyst powder (B) contains the Zr and the rare-earth metal in such a manner that a mass of an oxide of the rare-earth metal to a total mass of $ZrO_2$ and the oxide of the rare-earth metal is in the range of 4 to 32% on the basis of oxide conversion. This allows the catalyst powder (B) to effectively achieve the above advantages.

In the exhaust gas purifying method according to this embodiment, when the exhaust gas purifying catalyst formed by mixing the catalyst powder (A) consisting of a composite oxide which contains at least Ce, Zr, and a catalytic noble metal composition, and the catalyst powder (B) consisting of a Zr-based oxide which contains at least Zr and has Rh existing on a surface thereof, is used for purifying exhaust gas, $H_2$ created on the Zr-based oxide of the catalyst powder (B) is reacted with NOx attached on the composite oxide of the catalyst powder (A), and a temperature of the catalyst can be increased based on heat generated by the reaction between the $H_2$ and the NOx, to improve low-temperature catalytic activity. Specifically, under a rich (oxygen-deficient) exhaust atmosphere, $H_2$ is created on the Zr-based oxide of the catalyst powder (B) through a steam-reforming reaction. Although NOx is attached on the composite oxide of the catalyst powder (A), which contains at least Ce, Zr, and a catalytic metal composition, a part of the NOx is left on the composite oxide in an attached state, because this composite oxide contributes to enhancement in oxygen storage/releasing capability, but has poor NOx reduction function due to a low amount of the catalytic metal composition exposed on a surface thereof, as mentioned above. This meets a condition for readily inducing a reaction between the above created $H_2$ and the attached NOx, and therefore a NOx reduction reaction is facilitated by the created $H_2$ to convert the NOx into inert emissions. Then, the NOx reduction reaction can generate heat to increase a temperature of the catalyst layer so as to achieve enhanced low-temperature conversion efficiency for HC and CO under assistance of oxygen released from the catalyst powder (A). Thus, the steam-reforming reaction in the catalyst powder (B) can be utilized positively and effectively for the catalyst powder (A) which consists of a composite oxide containing at least Ce, Zr and a catalytic metal composition.

In this embodiment, the catalyst layer is formed on the honeycomb-shaped support. Alternatively, the catalyst layer is formed on any other suitable catalyst support to obtain the same advantages as those in this embodiment.

The exhaust gas purifying catalyst of the present invention, which is formed by mixing a first catalyst powder (A) consisting of a composite oxide which contains at least Ce, Zr, and a catalytic noble metal composition, and a second catalyst powder (B) consisting of a Zr-based oxide which contains at least Zr and has Rh existing on a surface thereof, can be suitably used in an exhaust system of a vehicle, such as an automobile.

It is understood that the present invention is not limited to the illustrated embodiment, but various modifications and changes in design may be made therein without departing from the spirit and scope of the present invention.

What is claimed is:

1. An exhaust gas purifying catalyst comprising a catalyst layer formed on a honeycomb-shaped support, wherein said catalyst layer is formed by mixing a first catalyst powder (A) consisting of a composite oxide which contains at least Ce, Zr, and a catalytic noble metal composition, and a second catalyst powder (B) consisting of a Zr-based oxide which consists of Zr as a primary component, at least one rare-earth metal selected from the group of Pr, Nd, La, Sm, Y, Yb, and Rh, and which has the Rh existing on a surface and in an inside of the Zr-based oxide, wherein a ratio of a mass of said second catalyst powder (B) to a total mass of said first catalyst powder (A) and said second catalyst powder (B) is in the range of 1 to 50%.

2. The exhaust gas purifying catalyst as defined in claim 1, wherein said composite oxide of said second catalyst powder (B) contains said Zr and said rare-earth metal in such a manner that a mass of an oxide of said rare-earth metal to a total mass of $ZrO_2$ and the oxide of said rare-earth metal is in the range of 4 to 32% on the basis of oxide conversion.

3. The exhaust gas purification catalyst as defined in claim 1, wherein the ratio of the mass of said second catalyst powder (B) to the total mass of said first catalyst powder (A) and said second catalyst powder (B) is in the range of 10 to 40%.

4. The exhaust gas purification catalyst as defined in claim 2, wherein the ratio of the mass of said second catalyst powder (B) to the total mass of said first catalyst powder (A) and said second catalyst powder (B) is in the range of 10 to 40%.

* * * * *